US007949806B2

(12) United States Patent
Jones et al.

(10) Patent No.: US 7,949,806 B2
(45) Date of Patent: May 24, 2011

(54) APPARATUS AND METHOD TO PROVIDE AN OPERATION TO AN INFORMATION STORAGE DEVICE INCLUDING PROTOCOL CONVERSION AND ASSIGNING PRIORITY LEVELS TO THE OPERATION

(75) Inventors: Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/994,067

(22) Filed: Nov. 18, 2004

(65) Prior Publication Data

US 2006/0106752 A1    May 18, 2006

(51) Int. Cl.
  G06F 3/00   (2006.01)
  G06F 5/00   (2006.01)
  G06F 13/12  (2006.01)
  G06F 13/00  (2006.01)
  H04L 12/28  (2006.01)
  H04J 3/16   (2006.01)

(52) U.S. Cl. .................. 710/65; 710/6; 710/36; 710/54; 710/62; 710/67; 370/412; 370/414; 370/465; 370/466; 711/114

(58) Field of Classification Search .......................... None
See application file for complete search history.

(56) References Cited

U.S. PATENT DOCUMENTS

| | | | | |
|---|---|---|---|---|
| 5,142,627 A | * | 8/1992 | Elliot et al. ........................ 710/5 |
| 5,724,358 A | * | 3/1998 | Headrick et al. ............... 370/418 |
| 5,933,784 A | | 8/1999 | Gallagher et al. |
| 6,085,227 A | * | 7/2000 | Edlund et al. .................. 709/203 |
| 6,111,893 A | * | 8/2000 | Volftsun et al. ................ 370/466 |
| 6,321,093 B1 | * | 11/2001 | Dalal ............................. 455/512 |
| 6,341,368 B1 | * | 1/2002 | Deans ........................... 717/100 |
| 6,449,285 B1 | | 9/2002 | Mills |
| 6,463,056 B1 | | 10/2002 | Silva et al. |
| 6,549,978 B2 | * | 4/2003 | Mansur et al. ................. 711/114 |

(Continued)

OTHER PUBLICATIONS

"PARSECMD." z/VM V5R3.0 CMS Commands and Utilities Reference (SC24-6073-02). IBM. Feb. 1, 2001. Accessed at http://publib.boulder.ibm.com/infocenter/zvm/v5r3/topic/com.ibm.zvm.v53.dmsb4/hcsd8b2076.htm.*

Primary Examiner — Tariq Hafiz
Assistant Examiner — Henry Yu
(74) Attorney, Agent, or Firm — Dale F. Regelman; Quarles & Brady LLP

(57) ABSTRACT

A method to provide an operation to an information storage device is disclosed. The method supplies an information storage device and a protocol conversion device capable of receiving an operation in a first communication protocol comprising a variable attribute, and providing that operation to the information storage device in a second communication protocol, where that second communication protocol does not support the variable attribute. The method provides an operation to the protocol conversion device using said first communication protocol, and determines if the variable attribute is configured in that operation. If the method determines that the variable attribute is not configured in the operation, then the method provides the operation to the information storage device using the second communication protocol. If the method determines that the variable attribute is configured in the operation, then the method implements that variable attribute when providing the operation to the information storage device using the second communication protocol.

25 Claims, 5 Drawing Sheets

U.S. PATENT DOCUMENTS

| | | |
|---|---|---|
| 6,587,911 B1 | 7/2003 | Kawamura et al. |
| 6,597,921 B2 | 7/2003 | Thandu |
| 6,650,632 B1 | 11/2003 | Volftsun et al. |
| 6,668,319 B1 * | 12/2003 | Newell et al. ............... 713/100 |
| 7,002,980 B1 * | 2/2006 | Brewer et al. ............... 370/414 |
| 7,057,981 B2 * | 6/2006 | Kano et al. ............... 369/30.28 |
| 7,093,033 B2 * | 8/2006 | Beckett et al. ............... 710/11 |
| 7,177,913 B2 * | 2/2007 | Connor ............... 709/212 |
| 7,260,777 B2 * | 8/2007 | Fitzsimons et al. ............ 715/255 |
| 7,308,512 B1 * | 12/2007 | Son ............... 710/38 |
| 7,376,147 B2 * | 5/2008 | Seto et al. ............... 370/465 |
| 7,562,180 B2 * | 7/2009 | Gyl et al. ............... 711/103 |
| 2002/0062387 A1 * | 5/2002 | Yatziv ............... 709/236 |
| 2003/0041278 A1 * | 2/2003 | Lin ............... 714/1 |
| 2003/0115433 A1 * | 6/2003 | Kodama ............... 711/162 |
| 2003/0133465 A1 * | 7/2003 | Alfano ............... 370/412 |
| 2005/0141424 A1 * | 6/2005 | Lim et al. ............... 370/235 |
| 2005/0160221 A1 * | 7/2005 | Yamazaki et al. ............ 711/114 |
| 2005/0256990 A1 * | 11/2005 | Schmisseur et al. ............ 710/306 |

\* cited by examiner

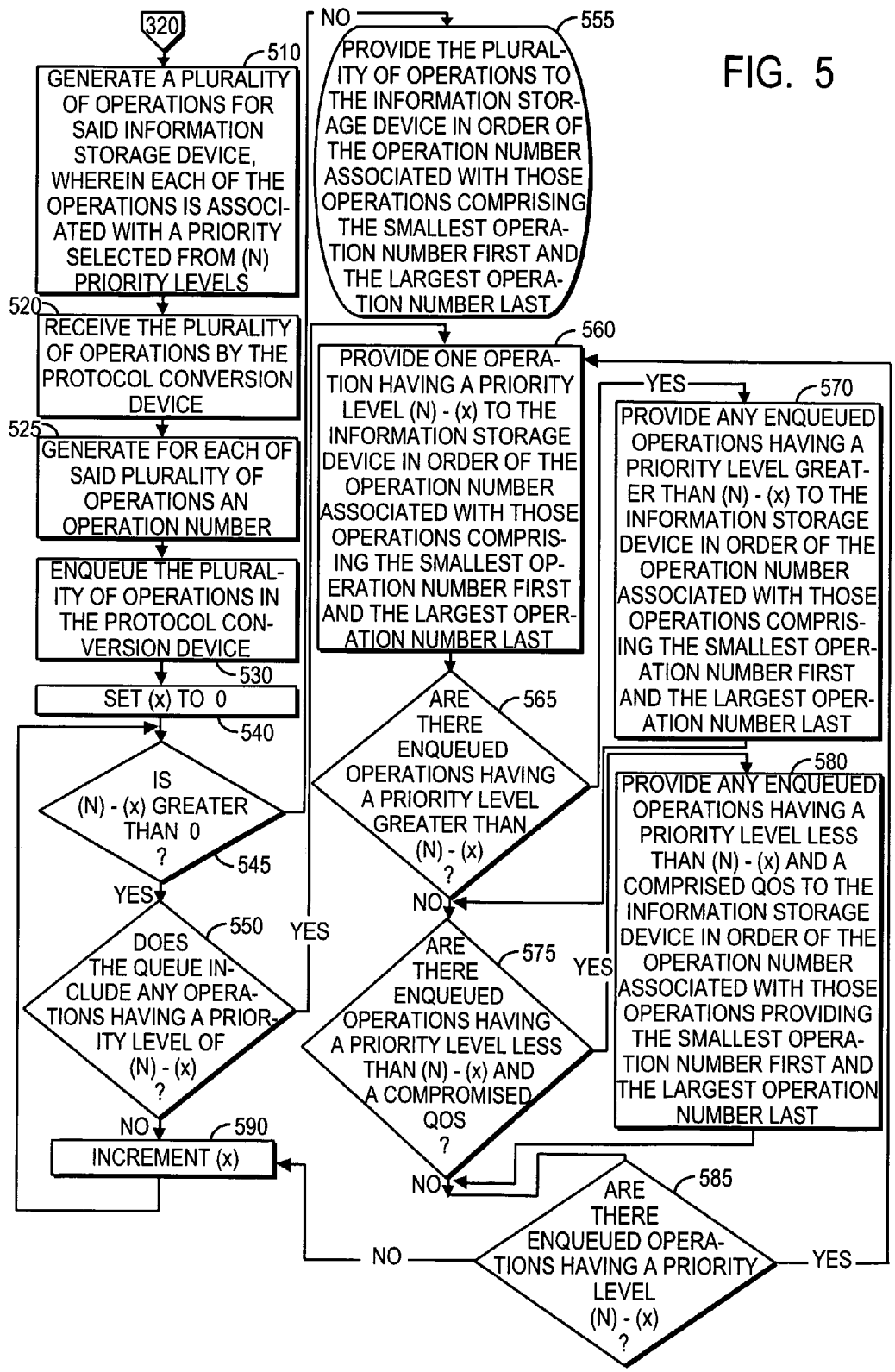

APPARATUS AND METHOD TO PROVIDE AN OPERATION TO AN INFORMATION STORAGE DEVICE INCLUDING PROTOCOL CONVERSION AND ASSIGNING PRIORITY LEVELS TO THE OPERATION

FIELD OF THE INVENTION

This invention relates to an apparatus and method to provide an operation to an information storage device.

BACKGROUND OF THE INVENTION

Data storage and retrieval systems are used to store information provided by one or more host computer systems. Such data storage and retrieval systems receive requests to write information to one or more information storage devices, and requests to retrieve information from those one or more information storage devices. Upon receipt of a write request, the system stores information received from a host computer in a data cache. In certain implementations, a copy of that information is also stored in a nonvolatile storage device. Upon receipt of a read request, the system recalls information from the one or more information storage devices and moves that information to the data cache. Thus, the system is continuously moving information to and from one or more information storage devices.

What is needed is a protocol conversion device which is capable of receiving an operation in a first communication protocol, where that first communication protocol supports one or more variable attributes, providing that operation in a second communication protocol to an information storage device, where that second communication protocol does not support the variable attribute, and implementing the variable attribute when providing the operation using the second communication protocol.

SUMMARY OF THE INVENTION

Applicants' invention includes an apparatus and method to provide an operation to an information storage device. The method supplies an information storage device and a protocol conversion device capable of receiving an operation in a first communication protocol comprising a variable attribute, and providing that operation to an information storage device in a second communication protocol, where that second communication protocol does not support the variable attribute.

The method provides an operation to the protocol conversion device using the first communication protocol, and determines if the variable attribute is configured in that operation. If the method determines that the variable attribute is not configured in the operation, then the method provides the operation to the information storage device using the second communication protocol. If the method determines that the variable attribute is configured in the operation, then the method implements that variable attribute when providing the operation to the information storage device using the second communication protocol.

BRIEF DESCRIPTION OF THE DRAWINGS

The invention will be better understood from a reading of the following detailed description taken in conjunction with the drawings in which like reference designators are used to designate like elements, and in which:

FIG. 5 is a flow chart summarizing the steps of a third embodiment of Applicants' method.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapter ports, a plurality of device adapter ports, and a data cache. The following description of Applicants' method to provide an operation receiving in a first communication protocol to an information storage device using a second communication protocol is not meant, however, to limit Applicants' invention to data processing applications, as the invention herein can be applied to communication protocol conversion in general.

Figure 1:
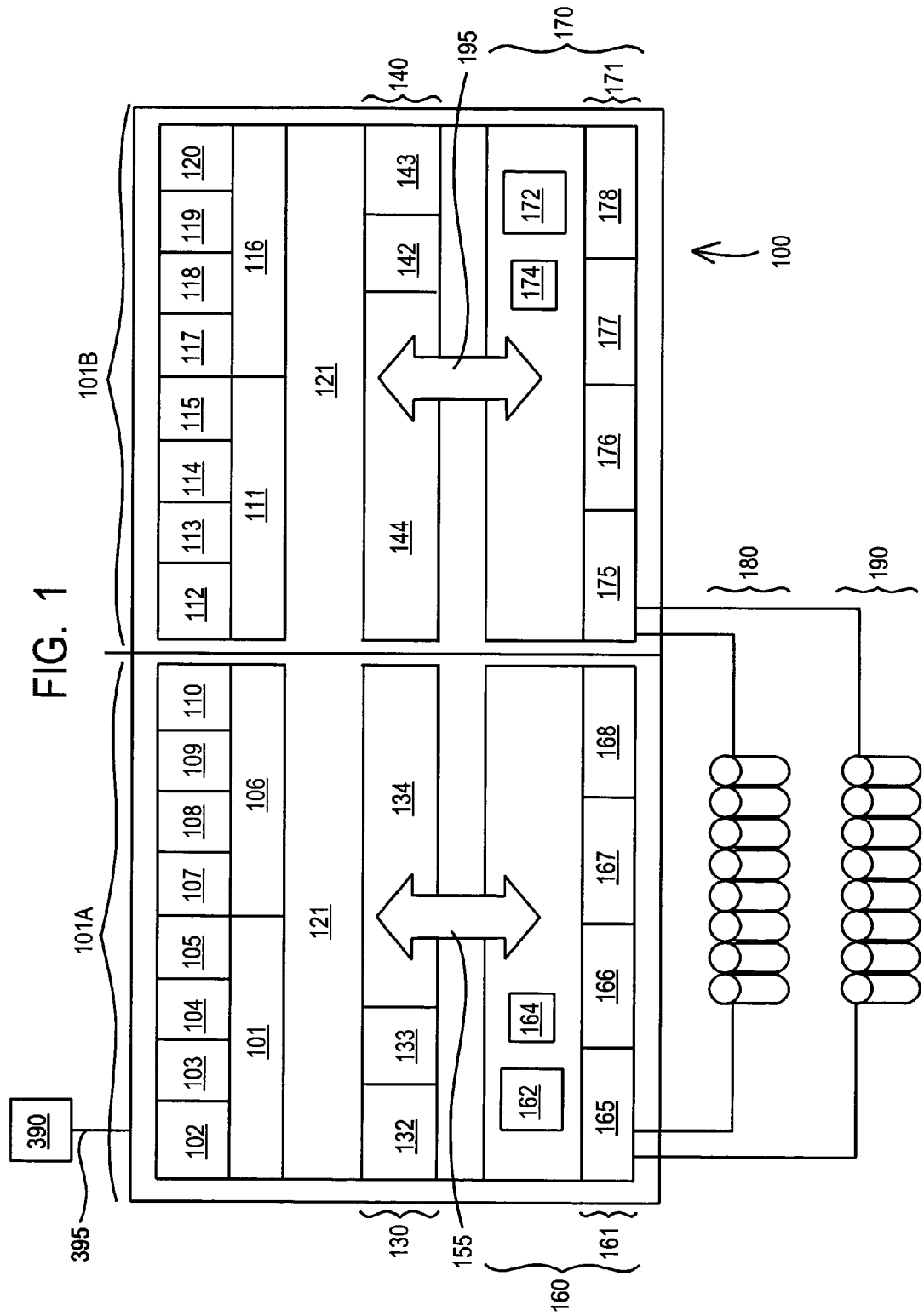
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapter ports 101A which includes adapters 102-105 and 107-110; and a second plurality of host adapter ports 101B which includes adapters 112-115 and 117-120. In other embodiments, Applicants' information storage and retrieval system includes fewer than 16 host adapter ports. Regardless of the number of host adapter ports disposed in any embodiments of Applicants' system, each of those host adapter ports comprises a shared resource that has equal access to both central processing/cache elements 130 and 140.

Each host adapter utilizes a host communication protocol, such as for example Fibre Channel, Ficon, ESCON, SCSI, iSCSI, Infiniband, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapter ports 161 which in the illustrated embodiment of FIG. 1 comprises device adapter ports 165, 166, 167, and 168. I/O portion 160 further comprise nonvolatile storage ("NVS") 162 and battery backup 164 for NVS 162.

I/O portion 170 comprises a plurality of device adapter ports 171 which in the illustrated embodiment of FIG. 1 comprises device adapter ports 175, 176, 177, and 178. I/O portion 170 further comprise nonvolatile storage ("NVS") 172 and battery backup 174 for NVS 172.

In certain embodiments of Applicants' system, one or more host adapter ports, processor portion 130, and one or more device adapter ports, are disposed in a first controller disposed in Applicants' information storage and retrieval system. Similarly, in certain embodiments, one or more host adapter ports, processor portion 140, and one or more device adapter ports, are disposed in second controller disposed in Applicants' information storage and retrieval system. In these embodiments, Applicants' system 100 includes two controllers interconnected with a plurality of data storage devices.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In other embodiments, arrays 180 and 190 comprise what is sometimes called a JBOD array, i.e. "Just a Bunch Of Disks" where the array is not configured according to RAID. In still other embodiments, arrays 180 and 190 comprise what is sometimes called a SBOD array, i.e. "Switched Bunch Of Disks," where those arrays are not configured according to RAID.

The illustrated embodiment of FIG. 1 shows two storage device arrays. In other embodiments, Applicants' system includes a single storage device array. In yet other embodiments, Applicants' system includes more than two storage device arrays.

Figure 2:
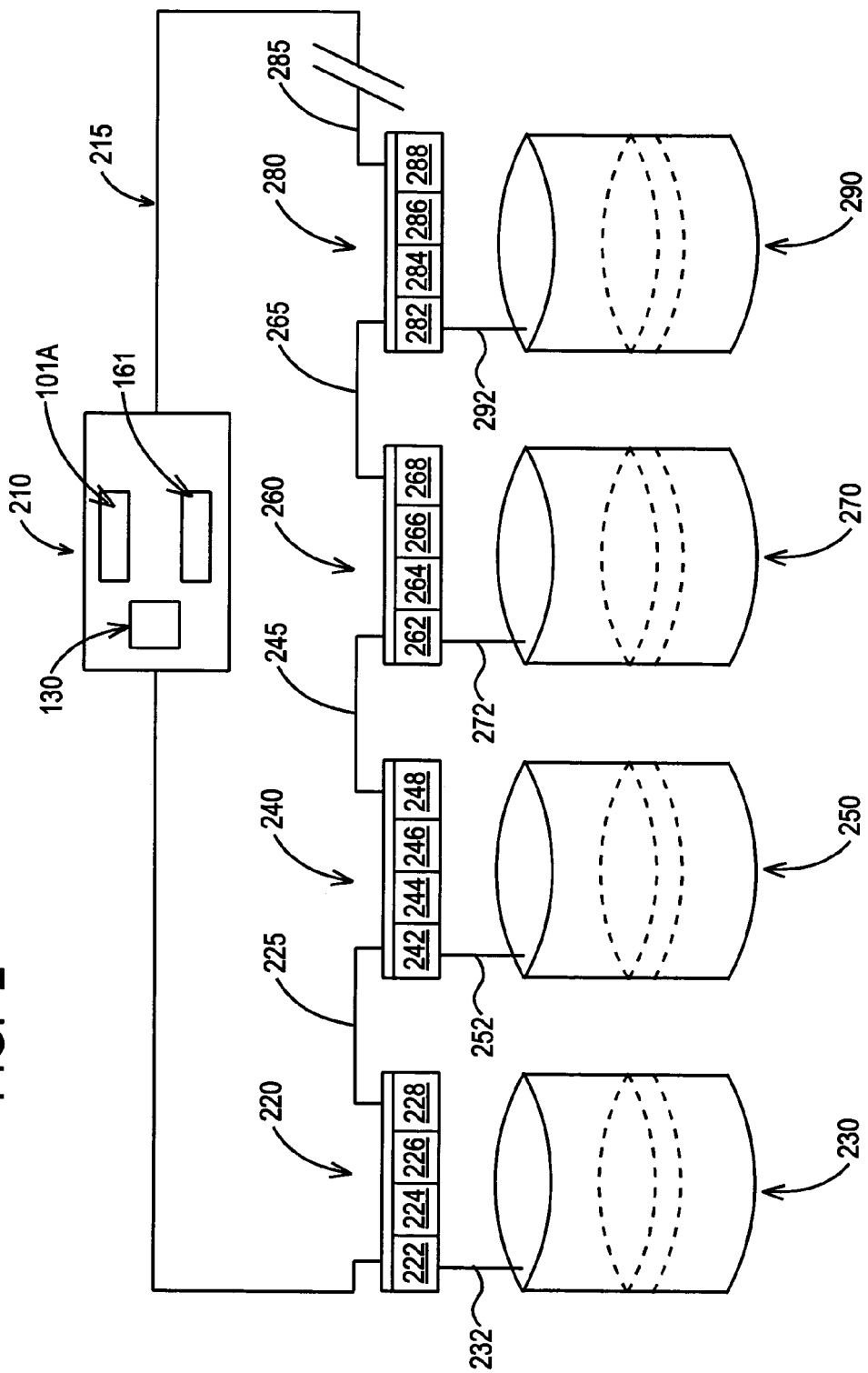
FIG. 2 is a block diagram showing a plurality of communication protocol conversion devices interconnecting a plurality of information storage devices to a controller.

Referring now to FIG. 2, regardless of the data storage media used in Applicants' information storage and retrieval system, e.g. a plurality of hard disks, each information storage device, which includes one or more of those storage media, is interconnected to a system controller 210 by a communication link 215. In certain embodiments, controller 210 includes a processor portion 130 (FIG. 1) in combination with one or more host adapter ports 101 (FIG. 1) and in combination with one or more device adapter ports 161 (FIG. 1).

In certain embodiments, controller 210 comprises a RAID controller. In certain embodiments, communication link 215 comprises a Fibre Channel Arbitrated Loop. In the illustrated embodiment of FIG. 2, communication link 215 includes link segments 225, 245, 265, and 285.

The loop structure shown in FIG. 2 comprises one embodiment of Applicants' system. In other embodiments, link 215 comprises a switched fabric or a combination of a switch and loop topologies. In other embodiments, link 215 comprises dual FC-AL loops of switches where the controller 210 is connected to two FC-AL loops. Each loop contains one or more Fibre Channel switches. The conversion devices 220, 240, etc connect point to point to switches on each loop. In other embodiments, each loop contains a single conversion device that performs a switching function that surfaces multiple point to point devices on each loop.

In some embodiments the conversion device, includes elements to perform communication protocol conversion from a first communication protocol to a second communication protocol. In other embodiments, the conversion device includes elements to perform both sector size conversion and a conversion from a first communication protocol to a second communication protocol. In some embodiments the first communication protocol is a Fibre Channel Protocol and the second communication protocol is Serial ATA or ATA. In other embodiments, the first communication protocol is Serial Attached SCSI and the second communication protocol is Serial ATA or ATA.

In all embodiments, Applicants' protocol conversion device is capable of communication protocol conversion. References herein to communication protocol conversion device include Applicants' devices capable of communication protocol conversion, and also to Applicants' devices capable of sector format conversion and communication protocol conversion.

Each storage device is interconnected to communication link 215 by a communication protocol conversion device, such as devices 220, 240, 260, and 280, which interconnect storage devices 230, 250, 270, and 290, respectively, to communication loop 215. Communication protocol conversion device 220 interconnects storage device 230 to loop 215 by communication link 232.

Communication link 225 interconnects communication protocol conversion device 220 and communication protocol conversion device 240. Communication protocol conversion device 240 interconnects storage device 250 with loop 215 by communication link 252. Communication link 245 interconnects communication protocol conversion device 240 and communication protocol conversion device 260. Communication protocol conversion device 260 interconnects storage device 270 to loop 215 by communication link 272.

Communication link 265 interconnects communication protocol conversion device 260 and communication protocol conversion device 280. Communication protocol conversion device 280 interconnects storage device 290 to loop 215 by communication link 292. Communication link 285 interconnects communication protocol conversion device 280 and communication loop 215. Communication links 232, 252, 272, and 292, are individually selected from a native drive line such as ATA or S-ATA.

Each communication protocol conversion device includes a data buffer, such as data buffers 222, 242, 262, and 282. Each communication protocol conversion device further includes a processor, such as processor 224, 244, 264, and 284. Each communication protocol conversion device further includes a queue, such as queue 228, 248, 268, and 288. Each communication protocol conversion device further includes a persistent memory, such a persistent memory 226, 246, 266, and 286. By persistent memory, Applicants mean non-volatile memory, i.e. memory that survives a loss of utility power. In certain embodiments, nonvolatile memory devices 226, 246, 266, and 286, are each individually selected from the group which includes one or more EEPROMs (Electrically Erasable Programmable Read Only Memory), one or more flash memories, battery backup RAM, hard disk drive, combinations thereof, and the like.

In designs that implement a protocol conversion device, the two base protocols may have different functionality built into the base architecture such that after protocol conversion occurs some of the feature/functions comprising a variable attribute that is architected in one protocol have no equivalent in the other protocol. Once such case is enabling a priority scheme to be implemented on information storage devices.

Where a transport layer protocol has a priority scheme available that could be implemented if it were attached to a device native to that protocol, that priority scheme may not be available when using a non-native device. For example, if a variable attribute is available in a Fibre Channel Protocol and is implemented for Fibre Channel devices, then the Protocol and the device interoperate to implement the variable attribute, such as a priority scheme.

If a variable attribute is available in a Fibre Channel Protocol and a Fibre Channel transport layer is used in combination with a protocol conversion device interconnected to a Serial ATA device where the variable attribute is not implemented, then using prior art apparatus and methods the variable attribute cannot be used. Applicants' apparatus and method includes a protocol conversion device, and method using same, that manages the implementation of the otherwise unsupported variable attribute after the protocol conversion process.

Figure 3:
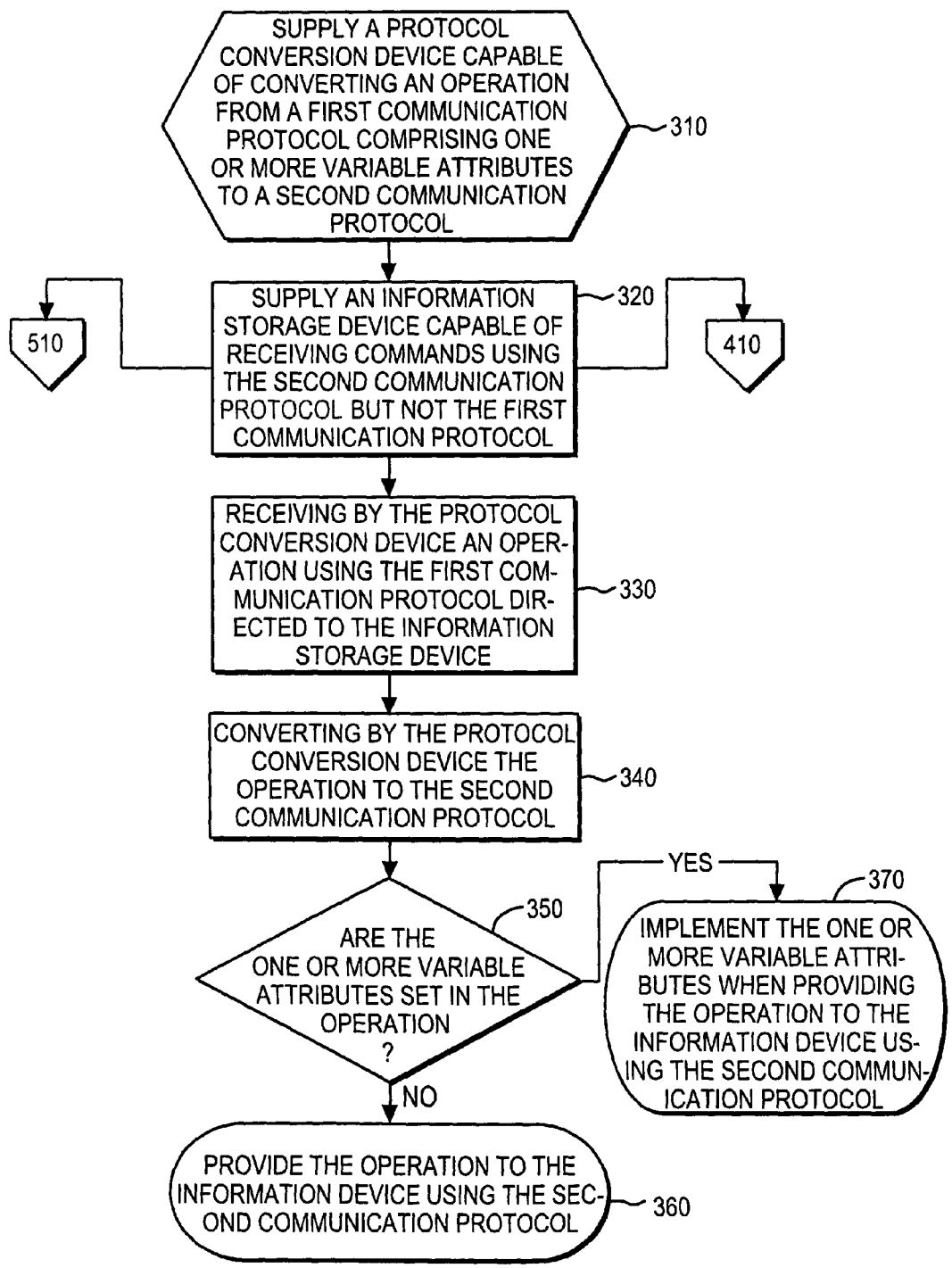
FIG. 3 is a flow chart summarizing the steps of one embodiment of Applicants' method.

FIG. 3 summarizes the steps in one embodiment of Applicants' method using Applicants' protocol conversion device. Referring to FIG. 3, in step 310 Applicants' method supplies a protocol conversion device capable of converting an operation from a first communication protocol, where that first communication protocol supports one or more variable attributes, to a second communication protocol which does not support those one or more variable attributes. In certain embodiments, the first communication protocol comprises a Fibre Channel Protocol. In certain embodiments, the first communication protocol comprises a Serial Attached SCSI Protocol. In certain embodiments, the second communication protocol comprises a Serial ATA Protocol. In certain embodiments, the second communication protocol comprises an ATA Protocol.

In step 320, Applicants' method provides an information storage device capable of receiving operations using the second communication protocol but not the first communication protocol. Step 320 further includes interconnecting Applicants' communication protocol conversion device, such as device 220 (FIG. 2), between the information storage device, such as device 230 (FIG. 2), and the system controller, such as controller 210 (FIG. 2).

In step 330, Applicants' communication protocol conversion device receives an operation using the first communication protocol, where that operation is directed to the interconnected information storage device. In certain embodiments, the operation of step 330 comprises a write command. In certain embodiments, the operations of step 330 comprises a read command. In certain embodiments, the operation of step 330 comprises a copy command.

In step 340, Applicants' communication protocol conversion device converts the operation from the first communication protocol to the second communication protocol. In certain embodiments, step 340 is performed by a processor, such as processor 222 (FIG. 2), disposed in the communication protocol conversion device, such as device 220 (FIG. 2).

In step 350, Applicants' communication protocol conversion device determines if any variable attributes supported and set in the first communication protocol are not supported in the second communication protocol. In certain embodiments, step 350 is performed by a processor, such as processor 222 (FIG. 2), disposed in the communication protocol conversion device, such as device 220 (FIG. 2).

If Applicants' communication protocol conversion device determines in step 350 that a variable attribute was not set in the first communication protocol, then the method transitions from step 350 to step 360 wherein the communication protocol conversion device provides the command to the information storage device using the second communication protocol. In certain embodiments, step 360 is performed by a processor, such as processor 222 (FIG. 2), disposed in the communication protocol conversion device, such as device 220 (FIG. 2).

Alternatively, if Applicants' communication protocol conversion device determines in step 350 that a variable attribute was set in the first communication protocol but is not supported in the second communication protocol, then the method transitions from step 350 to step 370 wherein Applicants' communication protocol conversion device implements that variable attribute when providing the command to the information storage device using the second communication protocol. In certain embodiments, step 370 is performed by a processor, such as processor 222 (FIG. 2), disposed in the communication protocol conversion device, such as device 220 (FIG. 2).

Figure 4:
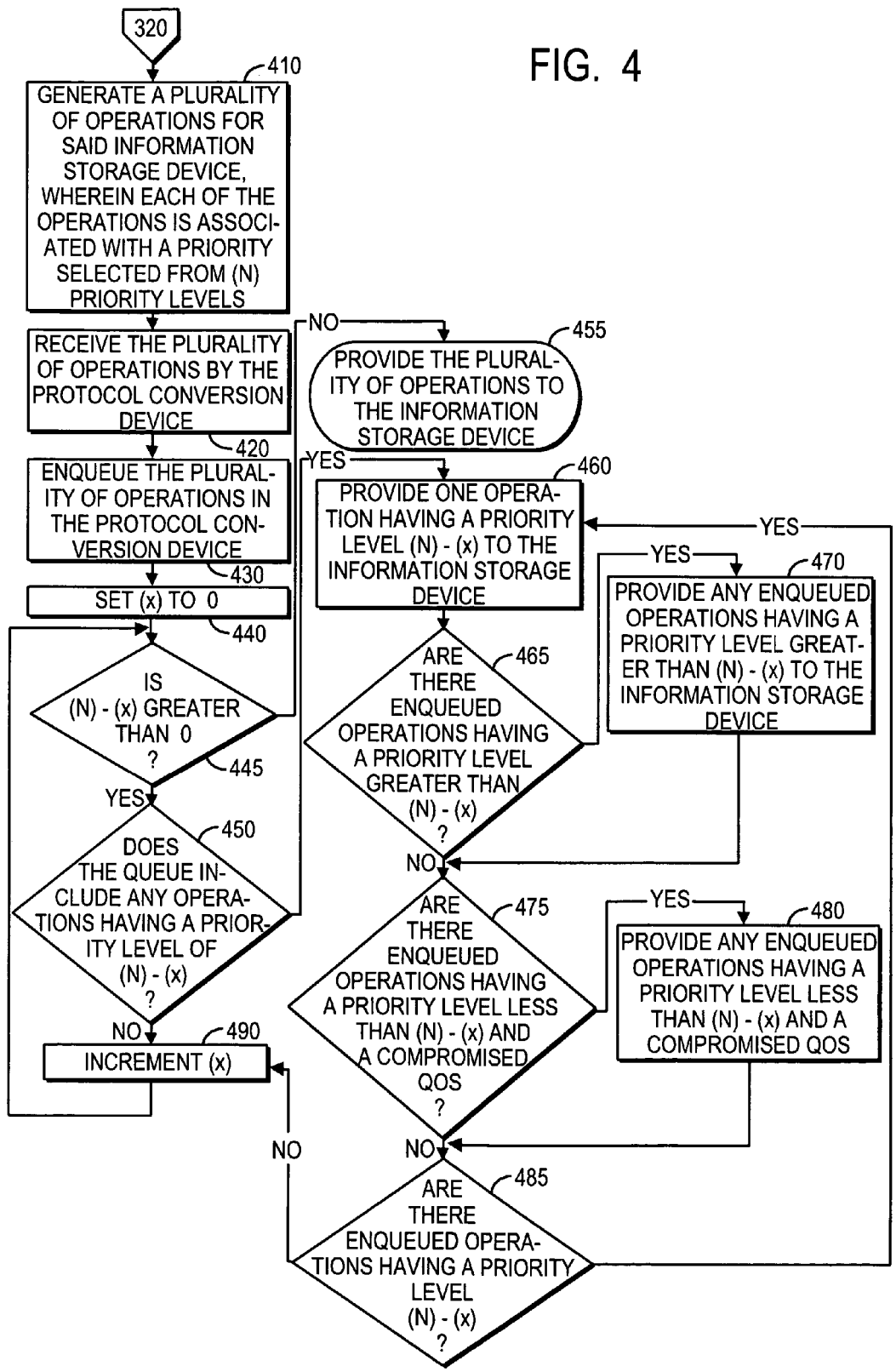
FIG. 4 is a flow chart summarizing the steps of a second embodiment of Applicants' method.

In certain embodiments, Applicants' method transitions from step 320 to step 410 (FIG. 4). Referring now to FIG. 4, in step 410 Applicants' method generates a plurality of operations for the information storage device, where each of those operations is associated with a priority selected from (N) priority levels. In certain embodiments, the plurality of operations comprises one or more write operations, and/or one or more read operations, and/or one or more copy operations.

In certain embodiments, (N) is two. In certain embodiments, (N) is three. In certain embodiments, (N) is greater than three.

In certain embodiments, the plurality of operations of step 410 are generated by a host computer, such as host computer 390 (FIG. 1). In certain embodiments, the plurality of operations of step 410 are generated by a system controller, such as system controller 210 (FIG. 2).

In step 420, Applicants' protocol conversion device receives the plurality of operations. In certain embodiments, step 420 further includes providing the plurality of operations from a host computer to Applicants' protocol conversion device. In certain embodiments, step 420 further includes providing the plurality of operations by a system controller, such as controller 210, from a data cache, such as cache 134, to Applicants' protocol conversion device.

Applicants' method transitions from step 420 to step 430 wherein the method enqueues the plurality of operations received in step 420 in a queue, such as queue 228, disposed in Applicants' protocol conversion device, such as device 220 (FIG. 2). In certain embodiments, step 430 is performed by a processor, such as processor 222 (FIG. 2), disposed in Applicants' protocol conversion device, such as device 220.

In step 440, Applicants' method selects one of the (N) priority levels. In certain embodiments, step 440 includes selecting initially the highest priority level. In certain embodiments, step 440 further comprises selecting the (N)-(x) priority level, wherein (x) is set to 0. In certain embodiments, step 430 is performed by a processor, such as processor 222 (FIG. 2), disposed in Applicants' protocol conversion device, such as device 220.

Applicants' method transitions from step 440 to step 445 wherein the method determines if the selected priority level (N)-(x) is greater than 0. In certain embodiments, step 445 is performed by a processor, such as processor 222 (FIG. 2), disposed in Applicants' protocol conversion device, such as device 220.

If Applicants' method determines in step 445 that (N)-(x) is not greater than 0, then the method transitions from step 445 to step 455 wherein the method provides to the interconnected information storage device, such as device 230, each of the plurality of operations from the queue, such as queue 228, disposed in the protocol conversion device, such as device 220, interconnecting the information storage device and the system controller, such a controller 210. In certain embodiments, step 455 is performed by a processor, such as processor 222 (FIG. 2), disposed in Applicants' protocol conversion device, such as device 220.

If Applicants' method determines in step 445 that (N)-(x) is greater than 0, then the method transitions from step 445 to step 450 wherein the method determines if the queue includes any operations having the selected priority level of (N)-(x). In certain embodiments, step 450 is performed by a processor, such as processor 222 (FIG. 2), disposed in Applicants' protocol conversion device, such as device 220.

If Applicants' method determines in step 450 that the queue does not include one or more operations having the selected priority level of (N)-(x), then the method transitions from step 450 to step 490 wherein the method increments (x). In certain embodiments, step 490 includes setting (x) equal to (x)+1. In certain embodiments, step 490 is performed by a processor, such as processor 222 (FIG. 2), disposed in Applicants' protocol conversion device, such as device 220. Applicants' method transitions from step 490 to step 445 and continues as described herein.

If Applicants' method determines in step 450 that the queue includes one or more operations having the selected priority level of (N)-(x), then the method transitions from step 450 to step 460 wherein Applicants' method provides to the information storage device one operation having the selected priority level of (N)-(x). In certain embodiments, step 460 is performed by a processor, such as processor 222 (FIG. 2), disposed in Applicants' protocol conversion device, such as device 220.

Applicants' method transitions from step 460 to step 465 wherein the method determines if there are any enqueued operations having a priority greater than the selected priority level of (N)-(x). In certain embodiments, step 465 is performed by a processor, such as processor 222 (FIG. 2), disposed in Applicants' protocol conversion device, such as device 220.

If Applicants' method determines in step 465 that there are any enqueued operations having a priority greater than the selected priority level of (N)-(x), then the method transitions from step 465 to step 470 wherein the method provides to the data storage device those enqueued operations having a priority greater than the selected priority level of (N)-(x). In certain embodiments, step 470 is performed by a processor, such as processor 222 (FIG. 2), disposed in Applicants' protocol conversion device, such as device 220. Applicants' method transitions from step 470 to step 475.

If Applicants' method determines in step 465 that there are no enqueued operations having a priority greater than the selected priority level of (N)-(x), then the method transitions from step 465 to step 475 wherein the method determines if there are any enqueued operation having a priority less than the selected priority level of (N)-(x), and which comprise a compromised Quality of Service ("QOS") objective. In certain embodiments, step 475 is performed by a processor, such as processor 222 (FIG. 2), disposed in Applicants' protocol conversion device, such as device 220.

QOS objectives comprise, for example, a defined time interval wherein the system should complete the operation. In the event the protocol conversion device continuously receives high priority operations, an enqueued lower priority operation may remain enqueued for a time interval exceeding the QOS time interval.

If Applicants' method determines in step 475 that there are enqueued operations having a priority less than the selected priority level of (N)-(x), and which comprise a compromised Quality of Service ("QOS") objective, then the method transitions from step 475 to step 480 wherein the method provides those enqueued operations having a priority less than the selected priority level of (N)-(x), and which comprise a compromised Quality of Service ("QOS") objective. In certain embodiments, step 480 is performed by a processor, such as processor 222 (FIG. 2), disposed in Applicants' protocol conversion device, such as device 220.

Applicants' method transitions from step 480 to step 485 and continues as described herein. If Applicants' method determines in step 475 that there are no enqueued operations having a priority less than the selected priority level of (N)-(x), and which comprise a compromised Quality of Service ("QOS") objective, then the method transitions from step 475 to step 485 wherein the method determines if there are additional enqueued operations having the selected priority level (N)-(x). In certain embodiments, step 485 is performed by a processor, such as processor 222 (FIG. 2), disposed in Applicants' protocol conversion device, such as device 220.

If Applicants' method determines in step 485 that there are additional enqueued operations having the selected priority level (N)-(x), then the method transitions from step 485 to step 460 and continues as described herein. If Applicants' method determines in step 485 that there are no additional enqueued operations having the selected priority level (N)-(x), then the method transitions from step 485 to step 490 and continues as described herein.

In certain embodiments of Applicants' invention, Applicants' apparatus and method implement two variable attributes set in the first communication protocol, but not supported in the second communication protocol. For example, in certain embodiments Applicants' method transitions from step 320 (FIG. 3) to step 510 (FIG. 5). Referring now to FIG. 5, in step 510 Applicants' method generates a plurality of operations for the information storage device, where each of those operations is associated with a priority selected from (N) priority levels. In certain embodiments, the plurality of operations comprises one or more write operations, and/or one or more read operations, and/or one or more copy operations.

In certain embodiments, (N) is two. In certain embodiments, (N) is three. In certain embodiments, (N) is greater than three.

In certain embodiments, the plurality of operations of step 510 are generated by a host computer, such as host computer 390 (FIG. 1). In certain embodiments, the plurality of operations of step 510 are generated by a system controller, such as system controller 210 (FIG. 2).

In step 520, Applicants' protocol conversion device receives the plurality of operations. In certain embodiments, step 520 further includes providing the plurality of operations from a host computer to Applicant's protocol conversion device. In certain embodiments, step 520 further includes providing the plurality of operations by a system controller, such as controller 210, from a data cache, such as cache 134, to Applicants' protocol conversion device.

In step 525, Applicants' method generates an operation number for each of the plurality of operations of step 510. In certain embodiments, step 525 is performed at the time each of the plurality of operations is generated, for example in step 510. In certain embodiments, the plurality of operation numbers of step 525 is generated by a host computer, such as host computer 390 (FIG. 1). In certain embodiments, the plurality of operation number of step 525 is generated by a system controller, such as controller 210 (FIG. 2).

In certain embodiments, the plurality of operation numbers is generated by Applicants' protocol conversion device. In certain of these embodiments, each operation number comprises a time stamp representing the time Applicants' protocol conversion device received that operation. In certain embodiments, step 525 is performed by a processor, such as processor 222 (FIG. 2), disposed in Applicants' protocol conversion device, such as device 220.

Applicants' method transitions from step 525 to step 530 wherein the method enqueues the plurality of operations received in step 520 in a queue, such as queue 228, disposed in Applicants' protocol conversion device, such as device 220 (FIG. 2). In certain embodiments, step 530 is performed by a processor, such as processor 222 (FIG. 2), disposed in Applicants' protocol conversion device, such as device 220.

In step 540, Applicants' method selects one of the (N) priority levels. In certain embodiments, step 540 includes selecting initially the highest priority level. In certain embodiments, step 540 further comprises selecting the (N)-(x) priority level, wherein (x) is set to 0. In certain embodiments, step 540 is performed by a processor, such as processor 222 (FIG. 2), disposed in Applicants' protocol conversion device, such as device 220.

Applicants' method transitions from step 540 to step 545 wherein the method determines if the selected priority level (N)-(x) is greater than 0. In certain embodiments, step 545 is performed by a processor, such as processor 222 (FIG. 2), disposed in Applicants' protocol conversion device, such as device 220.

If Applicants' method determines in step 545 that (N)-(x) is not greater than 0, then the method transitions from step 545 to step 555 wherein the method provides to the interconnected information storage device, such as device 230, the plurality of operations, in ascending order of the operation number, from the queue, such as queue 228, disposed in the protocol conversion device, such as device 220, interconnecting the information storage device and the system controller, such a controller 210. In certain embodiments, step 555 is performed by a processor, such as processor 222 (FIG. 2), disposed in Applicants' protocol conversion device, such as device 220, Applicants' method transitions from step 560 to step 565.

If Applicants' method determines in step 545 that (N)-(x) is greater than 0, then the method transitions from step 545 to step 550 wherein the method determines if the queue includes any operations having the selected priority level of (N)-(x). In certain embodiments, step 550 is performed by a processor, such as processor 222 (FIG. 2), disposed in Applicants' protocol conversion device, such as device 220.

If Applicants' method determines in step 550 that the queue does not include one or more operations having the selected priority level of (N)-(x), then the method transitions from step 550 to step 590 wherein the method increments (x). In certain embodiments, step 590 includes setting (x) equal to (x)+1. In certain embodiments, step 590 is performed by a processor, such as processor 222 (FIG. 2), disposed in Applicants' protocol conversion device, such as device 220. Applicants' method transitions from step 590 to step 545 and continues as described herein.

If Applicants' method determines in step 550 that the queue does include one or more operations having the selected priority level of (N)-(x), then the method transitions from step 550 to step 560 wherein the method provides to the interconnected information storage device from the queue one operation having the selected priority level (N)-(x) and the smallest operation number and/or earliest time stamp. In certain embodiments, step 560 is performed by a processor, such as processor 222 (FIG. 2), disposed in Applicants' protocol conversion device, such as device 220.

In certain embodiments, in step 560 the operation comprising the selected priority level and the smallest operation number is provided. In certain embodiments, in step 560 the operation comprising the selected priority level and the earliest time stamp is provided.

Applicants' method transitions from step 560 to step 565 wherein the method determines if there are any enqueued operations having a priority greater than the selected priority level of (N)-(x). In certain embodiments, step 565 is performed by a processor, such as processor 222 (FIG. 2), disposed in Applicants' protocol conversion device, such as device 220.

If Applicants' method determines in step 565 that there are enqueued operations having a priority greater than the selected priority level of (N)-(x), then the method transitions from step 565 to step 570 wherein the method provides to the data storage device those enqueued operations having a priority greater than the selected priority level of (N)-(x), in order of the operation numbers associated with those higher priority operations. In certain embodiments, step 570 is performed by a processor, such as processor 222 (FIG. 2), disposed in Applicants' protocol conversion device, such as device 220. Applicants' method transitions from step 570 to step 575.

If Applicants' method determines in step 565 that there are no enqueued operations having a priority greater than the selected priority level of (N)-(x), then the method transitions from step 565 to step 575 wherein the method determines if there are any enqueued operations having a priority less than the selected priority level of (N)-(x), and which comprise a compromised Quality of Service ("QOS") objective. In certain embodiments, step 575 is performed by a processor, such as processor 222 (FIG. 2), disposed in Applicants' protocol conversion device, such as device 220.

If Applicants' method determines in step 575 that there are enqueued operations having a priority less than the selected priority level of (N)-(x), and which comprise a compromised Quality of Service ("QOS") objective, then the method transitions from step 575 to step 580 wherein the method provides those enqueued operations having a priority less than the selected priority level of (N)-(x), and which comprise a compromised Quality of Service ("QOS") objective, by order of operation number. In certain embodiments, step 580 is performed by a processor, such as processor 222 (FIG. 2), disposed in Applicants' protocol conversion device, such as device 220. Applicants' method transitions from step 580 to step 585.

If Applicants' method determines in step 575 that there are no enqueued operations having a priority less than the selected priority level of (N)-(x), and which comprise a compromised Quality of Service ("QOS") objective, then the method transitions from step 575 to step 585 wherein the method determines if there are additional enqueued operations comprises the selected priority level (N)-(x). In certain embodiments, step 585 is performed by a processor, such as processor 222 (FIG. 2), disposed in Applicants' protocol conversion device, such as device 220.

If Applicants' method determines in step 585 that there are additional enqueued operations comprises the selected priority level (N)-(x), then the method transitions from step 585 to step 560 and continues as described herein. Alternatively, if Applicants' method determines in step 585 that there are no additional enqueued operations comprises the selected priority level (N)-(x), then the method transitions from step 585 to step 590 and continues as described herein.

The embodiments of Applicants' method recited in FIGS. 3, 4, and/or 5, may be implemented separately. Moreover, in certain embodiments, individual steps recited in FIGS. 3 4, and/or 5, may be combined, eliminated, or reordered.

In certain embodiments, Applicants' invention includes instructions residing in memory, such as for example memory 226 (FIG. 2), memory 246 (FIG. 2), memory 266 (FIG. 2), and/or memory 286 (FIG. 2), where those instructions are executed by processor 224 (FIG. 2), 244 (FIG. 2), 264 (FIG. 2), and/or 284 (FIG. 2), respectively, to performs steps 330, 340, 350, 360, and/or 370, recited in FIG. 3, and/or steps 420, 430, 440, 445, 450, 455, 460, 465, 470, 475, 480, 485, and/or 490, recited in FIG. 4, and/or steps 520, 525, 530, 540, 545, 550, 555, 560, 565, 570, 575, 580, 585, and/or 590, recited in FIG. 5.

In other embodiments, Applicants' invention includes instructions residing in any other computer program product, where those instructions are executed by a computer external to, or internal to, system 100, to performs steps 330, 340, 350, 360, and/or 370, recited in FIG. 3, and/or steps 420, 430, 440, 445, 450, 455, 460, 465, 470, 475, 480, 485, and/or 490, recited in FIG. 4, and/or steps 520, 525, 530, 540, 545, 550, 555, 560, 565, 570, 575, 580, 585, and/or 590, recited in FIG. 5. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide operations to an information storage device, comprising the steps of:
   supplying a data storage and retrieval system comprising a system controller in communication with a host computer comprising a storage management program, and a data cache;
   supplying a protocol conversion device in communication with and external to said system controller, wherein said protocol conversion device comprises a processor and a data queue and is capable of converting an operation from a first communication protocol to a second communication protocol, wherein said first communication protocol comprises a variable attribute, and wherein said second communication protocol does not comprise said variable attribute;
   supplying an information storage device capable of communicating said second communication protocol but not said first communication protocol, wherein said information storage device is external to and interconnected with said protocol conversion device;
   generating a plurality of operations by a host computer in communication with said data storage and retrieval system, wherein each operation is selected from the group consisting of a read command and a copy command, and wherein each operation is associated with a priority selected from a plurality of priority levels;
   providing said plurality of operations from said data cache to said protocol conversion device using said first communication protocol;
   generating an operation number for each of said plurality of operations by said protocol conversion device, wherein each operation number comprises a time stamp representing a time said protocol conversion device received an operation;
   enqueuing said plurality of operations in said data queue;
   sending from said data queue to said information storage device by said protocol conversion device an enqueued operation having a highest priority level;
   determining by said protocol conversion device if said variable attribute is configured in said enqueued operation;
   operative if said variable attribute is not configured in said enqueued operation, providing said enqueued operation by said protocol conversion device to said information storage device using said second communication protocol;
   operative if said variable attribute is configured in said enqueued operation, implementing said variable attribute by said protocol conversion device when providing said enqueued operation to said information storage device using said second communication protocol.

2. The method of claim 1, wherein said sending step further comprises sending from said data queue to said information storage device by said protocol conversion device an enqueued operation having an earliest time stamp operation number.

3. The method of claim 2, wherein said first communication protocol comprises a Fibre Channel Protocol, and wherein said second communication protocol comprises a Serial ATA Protocol.

4. The method of claim 1, wherein said plurality of priority levels comprises (N) priority levels, wherein a (N)th level comprises the highest priority and wherein a (1)st level comprises the lowest priority, wherein said sending step further comprises the steps of:
   setting (x) to 0;
   calculating if (N-x) is greater than 1;
   operative if (N-x) is greater than 1:
      ascertaining if the data queue includes one or more operations comprising the (N-x)th priority level;
      operative if the data queue includes one or more operations comprising the (N-x)th priority level, transmitting to said information storage device each of said one or more operations comprising the (N-x)th priority level;
      incrementing (x) and repeating said calculating steps and, until (N-x) equals 1, repeating said ascertaining step and said incrementing step, and optionally said transmitting step;
   operative if (N-x) equals 1, sending the remaining operations in the data queue to said information storage device.

5. The method of claim 4, wherein said first communication protocol comprises a Fibre Channel Protocol, and wherein said second communication protocol comprises a Serial ATA Protocol.

6. The method of claim 1, wherein said first communication protocol comprises a first variable attribute and a second variable attribute, wherein said first variable attribute comprises a priority scheme and said second variable attribute comprises a time stamp, further comprising the steps of:
 determining by said protocol conversion device if said first variable attribute is configured in said operation;
 determining by said protocol conversion device if said second variable attribute is configured in said operation;
 operative if neither said first attribute nor said second attribute is configured in said operation, providing said operation by said protocol conversion device using said second communication protocol to said information storage device without regard to either said first variable attribute or said second variable attribute;
 operative if said first variable attribute but not said second variable attribute is configured in said operation, providing said operation by said protocol conversion device using said second communication protocol to said information storage device based upon said first variable attribute;
 operative if said first variable attribute and said second variable attribute are configured in said operation, providing said operation by said protocol conversion device using said second communication protocol to said information storage device based upon said first variable attribute and said second variable attribute.

7. The method of claim 1, further comprising the steps of:
 based upon the priority and time stamps associated with each of said plurality of operations, sending seriatim said plurality of operations from said data queue to information storage device starting with the operation comprising the highest priority and the earliest time stamp and ending with the operation comprising the lowest priority and the latest time stamp.

8. The method of claim 7, wherein said plurality of priorities comprises (N) priority levels, wherein a (N)th level comprises a highest priority and wherein a (1)st level comprises the lowest priority, wherein said sending step further comprises the steps of:
 setting (x) to 0;
 calculating if (N-x) is greater than 1;
 operative if (N-x) is greater than 1:
  ascertaining if the data queue includes one or more operations comprising the (N-x)th priority level;
  operative if the data queue includes one or more operations comprising the (N-x)th priority level:
  transmitting to said information storage device each of said one or more operations comprising the (N-x)th priority based upon the time stamp associated with each of those one or more operations starting with the operation comprising the earliest time stamp and ending with the operation comprising the latest time stamp;
  incrementing (x) and repeating said calculating steps and, until (N-x) equals 1, repeating said ascertaining step and said incrementing step, and optionally said transmitting step;
 operative if (N-x) equals 1, sending the remaining operations in the data queue to said information storage device based upon the time stamp associated with each of those one or more operations starting with the operation comprising the earliest time stamp and ending with the operation comprising the latest time stamp.

9. The method of claim 8, wherein said first communication protocol comprises a Fibre Channel Protocol and wherein said second communication protocol comprises a Serial ATA Protocol.

10. A protocol conversion device disposed in a data storage and retrieval system comprising a storage controller and a data cache, wherein said protocol conversion device comprises a processor, a data queue, and a computer readable medium having computer readable program code disposed therein to convert to a second communication protocol, and provide to an information storage device, an operation received in a first communication protocol, wherein said first communication protocol comprises a variable attribute, and wherein said second communication protocol does not comprise said variable attribute, wherein said article of manufacture is external to and interconnected with a system controller disposed in a data storage and retrieval system in communication with a host computer comprising a storage management program, and wherein said article of manufacture is external to and interconnected with said information storage device, the computer readable program code comprising a series of computer readable program steps to effect:
 receiving an operation from said data cache using said first communication protocol, wherein said operation is selected from the group consisting of a read command and a copy command, and wherein said operation is associated with a priority selected from a plurality of priority levels;
 generating an operation number for said operation, wherein said operation number comprises a time stamp representing a time said protocol conversion device received said operation;
 enqueuing said operation in said data queue;
 sending from said data queue to said information storage device an enqueued operation having a highest priority level;
 determining if said variable attribute is configured in said enqueued operation;
 operative if said variable attribute is not configured in said enqueued operation, providing said operation to said information storage device using said second communication protocol;
 operative if said variable attribute is configured in said enqueued operation, implementing said variable attribute when providing said operation to said information storage device using said second communication protocol.

11. The protocol conversion device of claim 10, wherein said computer readable program code to send an enqueued operation further comprises step further comprises a series of computer readable program steps to effect sending from said data queue to said information storage device an enqueued operation having an earliest time stamp operation number.

12. The protocol conversion device of claim 11, wherein said first communication protocol comprises a Fibre Channel Protocol, and wherein said second communication protocol comprises a Serial ATA Protocol.

13. The protocol conversion device of claim 11, wherein said plurality of priority levels comprises (N) priority levels, wherein a (N)th level comprises the highest priority and wherein a (1)st level comprises the lowest priority, said computer readable program code further comprising a series of computer readable program steps to effect:
 setting (x) to 0;
 calculating if (N-x) is greater than 1;

operative if (N-x) is greater than 1:
  ascertaining if the data queue includes one or more operations comprising the (N-x)th priority level;
  operative if the data queue includes one or more operations comprising the (N-x)th priority level, transmitting to said information storage device each of said one or more operations comprising the (N-x)th priority level;
  incrementing (x) and repeating said calculating steps and, until (N-x) equals 1, repeating said ascertaining step and said incrementing step, and optionally said transmitting step;
operative if (N-x) equals 1, sending the remaining operations in the data queue to said information storage device.

14. The protocol conversion device of claim 10, wherein said first communication protocol comprises a first variable attribute and a second variable attribute, wherein said first variable attribute comprises a priority scheme and said second variable attribute comprises a time stamp, said computer readable program code further comprising a series of computer readable program steps to effect:
  determining if said first variable attribute is configured in said operation;
  determining if said second variable attribute is configured in said operation;
  operative if neither said first attribute nor said second attribute is configured in said operation, providing said operation using said second communication protocol to said information storage device without regard to either said first variable attribute or said second variable attribute;
  operative if said first variable attribute but not said second variable attribute is configured in said operation, providing said operation using said second communication protocol to said information storage device based upon said first variable attribute;
  operative if said first variable attribute and said second variable attribute are configured in said operation, providing said operation using said second communication protocol to said information storage device based upon said first variable attribute and said second variable attribute.

15. The protocol conversion device of claim 10, said computer readable program code further comprising a series of computer readable program steps to effect:
  based upon the priority and time stamps associated with each of said plurality of operations, sending seriatim said plurality of operations from said data queue to information storage device starting with the operation comprising the highest priority and the earliest time stamp and ending with the operation comprising the lowest priority and the latest time stamp.

16. The protocol conversion device of claim 15, wherein said priority scheme comprises (N) priority levels, wherein a (N)th level comprises a highest priority and wherein a (1)st level comprises the lowest priority, said computer readable program code further comprising a series of computer readable program steps to effect:
  setting (x) to 0;
  calculating if (N-x) is greater than 1;
  operative if (N-x) is greater than 1:
    ascertaining if the data queue includes one or more operations comprising the (N-x)th priority level;
    operative if the data queue includes one or more operations comprising the (N-x)th priority level, transmitting to said information storage device each of said one or more operations comprising the (N-x)th priority based upon the time stamp associated with each of those one or more operations starting with the operation comprising the earliest time stamp and ending with the operation comprising the latest time stamp;
    incrementing (x) and repeating said calculating steps and, until (N-x) equals 1, repeating said ascertaining step and said incrementing step, and optionally said transmitting step;
  operative if (N-x) equals 1, sending the remaining operations in the data queue to said information storage device based upon the time stamp associated with each of those one or more operations starting with the operation comprising the earliest time stamp and ending with the operation comprising the latest time stamp.

17. The protocol conversion device of claim 16, wherein said first communication protocol comprises a Fibre Channel Protocol and wherein said second communication protocol comprises a Serial ATA Protocol.

18. A computer program product embodied in a computer readable medium disposed in a protocol conversion device comprising a data queue and in communication with and external to a system controller disposed in a data storage and retrieval system comprising a data cache and in communication with a host computer comprising a storage management program, wherein said protocol conversion device is external to and in communication with an information storage medium, said computer program product being usable with a programmable computer processor to convert to a second communication protocol, and provide to said information storage device, an operation received in a first communication protocol, wherein said first communication protocol comprises a variable attribute, and wherein said second communication protocol does not comprise said variable attribute, comprising:
  computer readable program code which causes said programmable computer processor to receive an operation from said data cache using said first communication protocol, wherein said operation is selected from the group consisting of a read command, a write command, and a copy command, and wherein said operation is associated with a priority selected from a plurality of priority levels;
  computer readable program code which causes said programmable computer processor to generate an operation number for each of said plurality of operations by said protocol conversion device, wherein each operation number comprises a time stamp representing a time said protocol conversion device received an operation;
  computer readable program code which causes said programmable computer processor to enqueue said operation in said data queue;
  computer readable program code which causes said programmable computer processor to send from said data queue to said information storage device an enqueued operation having a highest priority level;
  computer readable program code which causes said programmable computer processor to determine if said variable attribute is configured in said enqueued operation;
  computer readable program code which, if said variable attribute is not configured in said enqueued operation, causes said programmable computer processor to provide said enqueued operation to said information storage device using said second communication protocol;

computer readable program code which, if said variable attribute is configured in said enqueued operation, causes said programmable computer processor to implement said variable attribute when providing said enqueued operation to said information storage device using said second communication protocol.

19. The computer program product of claim 18, wherein said computer readable program code to send an enqueued operation further comprises step further comprises computer readable program code which causes said programmable computer processor to send from said data queue to said information storage device an enqueued operation having an earliest time stamp operation number.

20. The computer program product of claim 19, wherein said first communication protocol comprises a Fibre Channel Protocol, and wherein said second communication protocol comprises a Serial ATA Protocol.

21. The computer program product of claim 18, wherein said plurality of priority levels comprises (N) priority levels, wherein a (N)th level comprises the highest priority and wherein a (1)st level comprises the lowest priority, further comprising:
- computer readable program code which causes said programmable computer processor to set (x) to 0;
- computer readable program code which causes said programmable computer processor to calculate if (N-x) is greater than 1;
- computer readable program code which, if (N-x) is greater than 1 causes said programmable computer processor to ascertain if the data queue includes one or more operations comprising the (N-x)th priority level;
- computer readable program code which, if the data queue includes one or more operations comprising the (N-x)th priority level, causes said programmable computer processor to transmit to said information storage device each of said one or more operations comprising the (N-x)th priority level;
- computer readable program code which, if (N-x) equals 1, causes said programmable computer processor to send the remaining operations in the data queue to said information storage device.

22. The computer program product of claim 18, wherein said first communication protocol comprises a first variable attribute and a second variable attribute, wherein said first variable attribute comprises a priority scheme and said second variable attribute comprises a time stamp, further comprising:
- computer readable program code which causes said programmable computer processor to determine if said first variable attribute is configured in said operation;
- computer readable program code which causes said programmable computer processor to determine if said second variable attribute is configured in said operation;
- computer readable program code which, if neither said first attribute nor said second attribute is configured in said operation, causes said programmable computer processor to provide said operation using said second communication protocol to said information storage device without regard to either said first variable attribute or said second variable attribute;
- computer readable program code which, if said first variable attribute but not said second variable attribute is configured in said operation, causes said programmable computer processor to provide said operation using said second communication protocol to said information storage device based upon said first variable attribute;
- computer readable program code which, if said first variable attribute and said second variable attribute are configured in said operation, causes said programmable computer processor to provide said operation using said second communication protocol to said information storage device based upon said first variable attribute and said second variable attribute.

23. The computer program product of claim 22, further comprising:
- computer readable program code which causes said programmable computer processor to, based upon the priority and time stamps associated with each of said plurality of operations, send seriatim said plurality of operations from said data queue to information storage device starting with the operation comprising the highest priority and the earliest time stamp and ending with the operation comprising the lowest priority and the latest time stamp.

24. The computer program product of claim 23, wherein said priority scheme comprises (N) priority levels, wherein the (N)th level comprises the highest priority and wherein the (1)st level comprises the lowest priority, further comprising:
- computer readable program code which causes said programmable computer processor to set (x) to 0;
- computer readable program code which causes said programmable computer processor to calculate if (N-x) is greater than 1;
- computer readable program code which, if (N-x) is greater than 1 causes said programmable computer processor to ascertain if the data queue includes one or more operations comprising the (N-x)th priority level;
- computer readable program code which, if the data queue includes one or more operations comprising the (N-x)th priority level causes said programmable computer processor to transmit to said information storage device each of said one or more operations comprising the (N-x)th priority based upon the time stamp associated with each of those one or more operations starting with the operation comprising the earliest time stamp and ending with the operation comprising the latest time stamp;
- computer readable program code which, if (N-x) equals 1, causes said programmable computer processor to send the remaining operations in the data queue to said information storage device based upon the time stamp associated with each of those one or more operations starting with the operation comprising the earliest time stamp and ending with the operation comprising the latest time stamp.

25. The computer program product of claim 24, wherein said first communication protocol comprises a Fibre Channel Protocol and wherein said second communication protocol comprises a Serial ATA Protocol.

* * * * *